(12) United States Patent
Lowman et al.

(10) Patent No.: US 12,505,741 B2
(45) Date of Patent: Dec. 23, 2025

(54) REAL-TIME AUTONOMOUS VEHICLE FLEET PARKING AVAILABILITY

(71) Applicant: GM CRUISE HOLDINGS LLC, San Francisco, CA (US)

(72) Inventors: Joseph Lowman, San Francisco, CA (US); Tucker Paxton, San Mateo, CA (US); Allen Tang, Millbrae, CA (US); Alexander Bowe, San Francisco, CA (US); Jacob Yunis, Brooklyn, NY (US); Kelan Stoy, Albany, CA (US); Mamoon Masud, Austin, TX (US); Edward Henry Forscher, Oakland, CA (US); Xiaobai Chen, Chicago, IL (US); Enrique Fernandez Gonzalez, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 188 days.

(21) Appl. No.: 18/480,819

(22) Filed: Oct. 4, 2023

(65) Prior Publication Data

US 2025/0118203 A1    Apr. 10, 2025

(51) Int. Cl.
*G08G 1/14* (2006.01)
*B60W 30/06* (2006.01)
*B60W 60/00* (2020.01)

(52) U.S. Cl.
CPC .............. *G08G 1/14* (2013.01); *B60W 30/06* (2013.01); *B60W 60/001* (2020.02); *B60W 2540/049* (2020.02); *B60W 2552/53* (2020.02); *B60W 2554/406* (2020.02); *B60W 2555/60* (2020.02); *B60W 2556/10* (2020.02); *B60W 2556/45* (2020.02)

(58) Field of Classification Search
CPC ........ G08G 1/14; G08G 1/0112; G08G 1/143; G08G 1/147; G08G 1/148; G08G 1/202; B60W 30/06; B60W 60/001; B60W 2540/049; B60W 2552/53; B60W 2554/406; B60W 2555/60; B60W 2556/10; B60W 2556/45
See application file for complete search history.

(56) References Cited

U.S. PATENT DOCUMENTS 9,564,052 B2 *    2/2017    Gruteser ................. G08G 1/01

\* cited by examiner

*Primary Examiner* — Daryl C Pope
(74) *Attorney, Agent, or Firm* — CANTOR COLBURN LLP

(57) ABSTRACT

Disclosed are embodiments for facilitating real-time autonomous vehicle (AV) fleet parking availability. In some aspects, an embodiment includes determining, based on a first set of perception sensor inputs of an AV, sections of roadway that are used for vehicle parking; determining, based on a second set of perception sensor inputs, whether the sections of roadway are allowable for parking and are available for parking; transmitting parking location data comprising identification of parking location objects corresponding to the sections of roadway and signals indicating that the parking location object is used for vehicle parking, indicating whether the parking location object is allowable for parking, and indicating whether the parking location object is available for parking, wherein the parking location data is aggregated with other parking location data from other AVs into aggregated parking location data; and identifying a location for parking of the AV based on the aggregated parking location data.

20 Claims, 9 Drawing Sheets

400

Determine, based on a first set of perception sensor inputs of an autonomous vehicle (AV), sections of roadway that are used for vehicle parking
410

Determine, based on a second set of perception sensor inputs of the AV, whether each of the sections of roadway are allowable for parking and are available for parking
420

Transmit, by the AV to a server device aggregating signals from a fleet of AVs comprising the AV, parking location data including identification of parking location objects corresponding to the sections of roadway and one or more signals for each parking location object indicating that the parking location object is used for vehicle parking, indicating whether the parking location object is allowable for parking, and indicating whether the parking location object is available for parking
430

Identifying a location for parking for the AV based on the parking location data sent by the AV and based on other parking location data sent from other AVs in the fleet of AVs
440

Aggregate parking location data from autonomous vehicles (AVs) of a fleet of AVs, the parking location data including parking location objects identifying sections of roadway used for parking, one or more indications of whether the sections of roadway are allowable for parking and available for parking, and timestamps indicating a time of collection of the parking location data by the AVs

510

↓

Responsive to a request to determine a parking location for an AV of the fleet of AVs, identify, based on an indicated geographic location for parking of the AV, at least one parking location for the AV using the aggregated parking location data of the fleet of AVs

520

↓

Apply, using the timestamps, a decaying model to the identified at least one parking location to generate a likelihood that the at least one parking location is valid

530

↓

Generate a parking location recommendation for the AV based on the likelihood of availability of the identified at least one parking location

REAL-TIME AUTONOMOUS VEHICLE FLEET PARKING AVAILABILITY

BACKGROUND

1. Technical Field

The disclosure generally relates to the field of processing systems and, more specifically, to real-time autonomous vehicle fleet parking availability.

2. Introduction

Autonomous vehicles, also known as self-driving cars, driverless vehicles, and robotic vehicles, may be vehicles that use multiple sensors to sense the environment and move without a human driver. An example autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

BRIEF DESCRIPTION OF THE DRAWINGS

The various advantages and features of the disclosed technology will become apparent by reference to specific embodiments illustrated in the appended drawings. A person of ordinary skill in the art will understand that these drawings show some examples of the disclosed technology and would not limit the scope of the disclosed technology to these examples. Furthermore, the skilled artisan will appreciate the principles of the disclosed technology as described and explained with additional specificity and detail through the use of the accompanying drawings in which:

FIG. 4 illustrates an example method implementing real-time AV fleet parking availability, in accordance with embodiments herein;

FIG. 5 illustrates an example method for implementing aggregated parking location data from a fleet of AVs to provide for real-time AV fleet parking availability, in accordance with embodiments herein;

DETAILED DESCRIPTION

Figure 1:
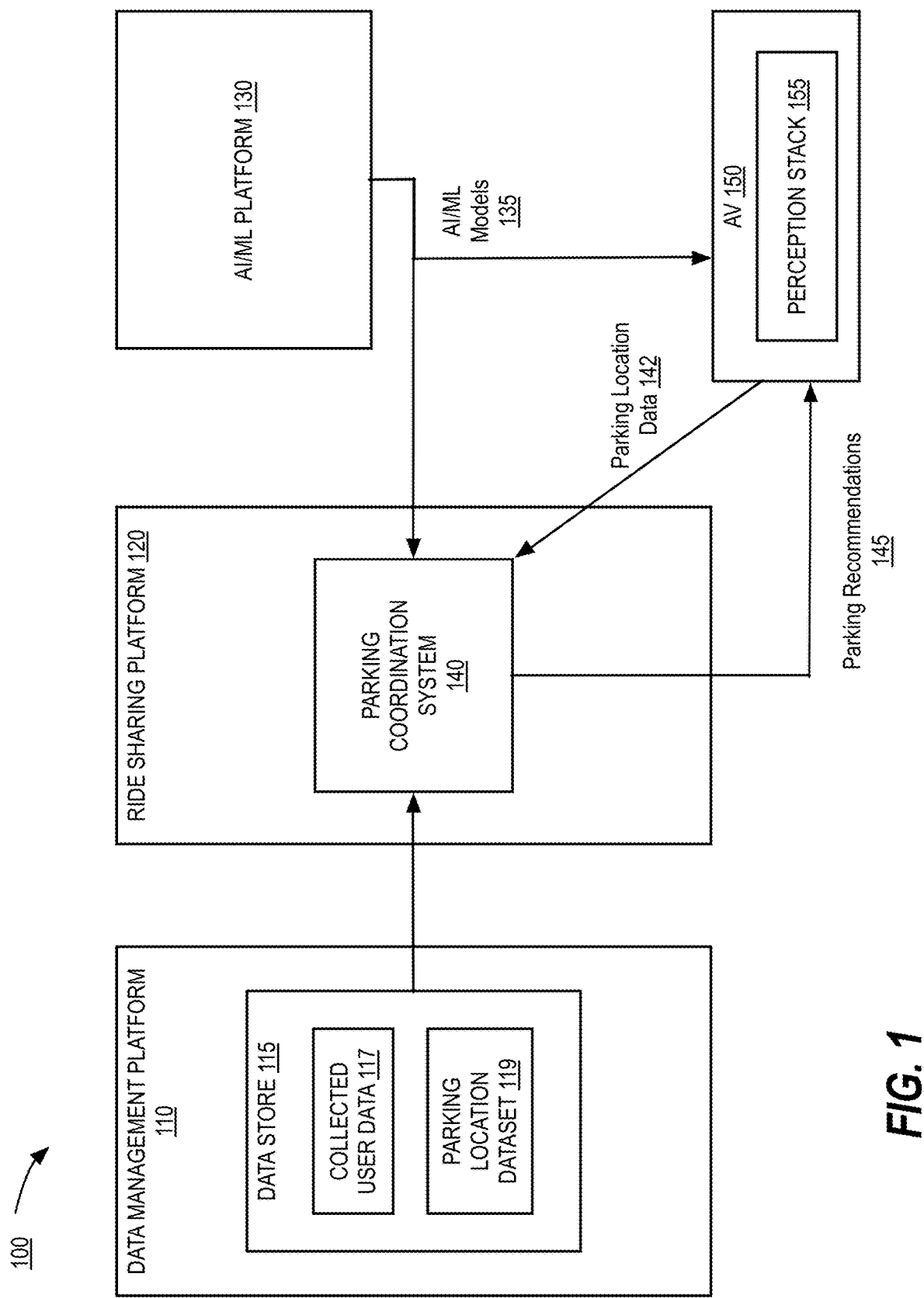
FIG. 1 is a block diagram of an example system illustrating an autonomous system for real-time autonomous vehicle (AV) fleet parking availability, in accordance with embodiments herein.

The detailed description set forth below is intended as a description of various configurations of the subject technology and is not intended to represent the configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Autonomous vehicles (AVs), also known as self-driving cars, driverless vehicles, and robotic vehicles, can be implemented by companies to provide self-driving car services for the public, such as taxi or ride-hailing (e.g., ridesharing) services. The AV can navigate about roadways without a human driver based upon sensor signals output by sensor systems deployed on the AV. AVs may utilize multiple sensors to sense the environment and move without a human driver. An example AV can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

AVs can be implemented by companies to provide self-driving car services for the public, such as taxi or ride-hailing (i.e., ridesharing) services (also referred to herein as AV ride-hailing services or AV self-driving car services). The AV self-driving car services can increase transportation options and provide a flexible and convenient way to transport users between locations. To use an AV self-driving car service, a user may typically request a ride through an application provided by the AV self-driving car service. When requesting the ride, the user can define a specific pick-up or drop-off location, which the AV self-driving service can use to identify the route of the user and select a nearby AV that is able to provide the requested ride to the user. The self-driving car service can then deploy the AV to pick up and transport the user to the drop-off location. Upon reaching the drop-off location, the user can disembark the AV and continue to their final destination.

As part of providing AV self-driving car services, the ability of the AV to locate an open parking space is an important part of informing routing decisions, providing pickup and dropoff suggestions to customers, informing delivery location decisions, and so on. A parking space as discussed herein may refer to an area where an AV can stop for a prolonged period of time (e.g., a parallel parking spot, a spot in a parking lot, etc.) or an area where the AV can stop for a short period of time (e.g., double park, a spot specifically designated for short term parking/pickups/dropoffs/delivery, etc.). In some approaches, the AV self-driving car service operates each AV independently from the other AVs in the fleet of AVs when an individual AV is making decisions on locating an open parking space. For example, at an initial stage of providing a car service trip to a customer, an individual AV may receive identification of pickup (PU) and dropoff (DO) locations from the customer and make an initial estimate of where the AV is going to stop. As the AV navigates closer to the PU or DO locations, it utilizes the perception information gathered by the AV to make a final determination of where to park. The AV makes this final determination without sharing information with any other AVs in the fleet of AVs. This may result in selection of a less than optimal parking location for the AV, which can extend the trip duration for the customer and/or reduce the overall customer experience, for example.

To address these noted technical problems and challenges, embodiments herein facilitate real-time AV fleet parking availability. Embodiments herein enable determining parking space locations, availability, and allowability (e.g., legality) for a single AV, as well as a methodology for sharing this information among a fleet of AV's. In some embodiments, the AV can utilize its perception system to resolve what portions of a navigable roadway are set aside for on-street parking. The AV can utilize a trained machine learning (ML) model to identify those portions of the navigable roadway that are used for parking. Various inputs from the perception system can be used by the trained ML model to make this determination. For those portions of the navigable roadway that are determined to be used for parking, embodiments herein may then utilize one or more other trained ML models to determine both allowability (e.g., "is it legal to park in this space?") and availability (e.g., "can the AV park here (even if illegal)?") of the portions of the navigable roadway. In some embodiments, a single ML model may be trained to determine portions of the navigable roadway that are used for parking, allowable for parking, and available for parking.

In embodiments herein, the parking location data determined by the AV can then be aggregated with parking location data generated by other AVs in the fleet(s) of AVs. The AVs in the fleet can have the ability to share both historical and real-time information about available parking or pullover locations based upon the determinations of single AVs. This shared information could improve routing and communication with customers regarding the best locations to be picked up or dropped off. As a result, embodiments herein can improve an AV's ability to find an open parking space, and to have AVs share information about open parking spaces. This information could be used to inform routing decisions, improve PU and DO suggestions to users, improve delivery locations, and so on.

Although some embodiments herein are described as operating in an AV, other embodiments may be implemented in an environment that is not an AV, such as, for example, other types of vehicles (human operated, driver-assisted vehicles, etc.), air and terrestrial traffic control, radar astronomy, air-defense systems, anti-missile systems, marine radars to locate landmarks and other ships, aircraft anti-collision systems, ocean surveillance systems, outer space surveillance and rendezvous systems, meteorological precipitation monitoring, altimetry and flight control systems, guided missile target locating systems, ground-penetrating radar for geological observations, and so on. Furthermore, other embodiments may be more generally implemented in any artificial intelligence and/or machine learning-type environment. The following description discussed embodiments as implemented in an automotive environment, but one skilled in the art will appreciate that embodiments may be implemented in a variety of different environments and use cases. Further details of the real-time AV fleet parking availability of embodiments herein are further described below with respect to FIGS. 1-8.

FIG. 1 is a block diagram of an example system 100 illustrating an autonomous system for real-time AV fleet parking availability, in accordance with embodiments herein. In one embodiment, system 100 implements a ridesharing platform 120 communicably coupled to an AV 150 for providing the real-time AV fleet parking availability, as described further herein. In some embodiments, the ridesharing platform 120 enables one or more services such as ride sharing, passenger delivery, or item delivery, for example. The system 100 of FIG. 1 can be, for example, part of a data center that is cloud-based or otherwise. In other examples, the system 100 can be part of an AV or a human-operated vehicle having an advanced driver assistance system (ADAS) that can utilize various sensors including radar sensors.

In one embodiment, system 100 can communicate over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.). In one embodiment, system 100 can be implemented using a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth.

The system 100 may be part of a data center for managing a fleet of AVs and AV-related services. The data center can send and receive various signals to and from an AV. These signals can include sensor data captured by the sensor systems of the AV, roadside assistance requests, software updates, ridesharing pick-up and drop-off instructions, and so forth. In some examples, the system 100 may be hosted in a data center that may also support a ridesharing service, a delivery service, a remote/roadside assistance service, street services (e.g., street mapping, street patrol, street cleaning, street metering, parking reservation, etc.), and the like. In some embodiments, the system 100 may be implemented in the AV itself or may be implemented in a server computing device.

In this example, the system 100 includes one or more of a data management platform 110, a ridesharing platform 120, and an Artificial Intelligence/Machine Learning (AI/ML) platform 130, among other systems, that are communicably coupled to an AV 150.

Data management platform 110 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. In one embodiment, the data management platform includes a data store 115 that stores collected user data 117 collected, for example, from the user (e.g., as part of setting up a user profile) and/or from operation of one or more AVs. In some embodiments, data store 115 may also include a location dataset 119 that stores location data, such as geographic location, ratings, and reviews of various geographic locations. This location data be provided from any source, including third-party sources that maintain databases of information regarding different locations (e.g., restaurants, hotels, shops, parks, etc.).

In some embodiments, the ridesharing platform 120 is utilized to interact with ridesharing application(s) (app) operating on client computing device(s) (not shown). Client computing device can include, for example and without limitation, a smartphone, a tablet computer, a laptop computer, a head-mounted display (HMD), a gaming system, a server, a smart device, a smart wearable device (e.g., smart watch; smart eyeglasses or other Head-Mounted Display (HMD); smart ear pods or other smart in-ear, on-ear, or over-ear device; etc.), and/or any other computing device. In some cases, the client computing device can be a passenger or client computing device. The client computing device can be a customer's mobile computing device or a computing device integrated with the AV 150.

The ridesharing platform 120 can receive requests from ridesharing app, such as user requests to be picked up or dropped off, and can dispatch an AV for a requested trip. The ridesharing platform 120 can also act as an intermediary between the ridesharing app and the AV. For example, ridesharing platform 120 can receive, from a passenger, instructions for the AV, such as instructions to go around an obstacle, change routes, select a drop-off location, honk the horn, etc. The ridesharing platform 120 can provide such instructions to the AV as requested.

The AI/ML platform 130 can provide an infrastructure for training and evaluating machine learning algorithms for operating the AV, the ridesharing platform 120, and other platforms and systems. In one embodiment, the AI/ML platform 130 of system 100 may include a dataset generator, a model trainer, and/or a model deployer. Using the dataset generator, model trainer, and/or the model deployer, data scientists can prepare data sets from the data management platform 110; select, design, and train machine learning models 135; evaluate, refine, and deploy the models 135; maintain, monitor, and retrain the models 135; and so on.

In embodiments herein, the ridesharing platform 120 implements a parking coordination system 140 for providing real-time AV fleet parking availability. The parking coordination system 140 may enable determining parking space locations, availability, and allowability (e.g., legality) for a single AV 150, as well as a methodology for sharing this information among a fleet of AV's.

In some embodiments, the AV 150 can utilize its perception stack 155 to resolve what portions of a navigable roadway are set aside for on-street parking. The perception stack 155 can enable the AV 150 to "see" (e.g., via cameras, LIDAR sensors, infrared sensors, RADAR, etc.), "hear" (e.g., via microphones, ultrasonic sensors, etc.), and "feel" (e.g., pressure sensors, force sensors, impact sensors, etc.) its environment using information from sensor systems of the AV 150, a mapping and localization stack of the AV 150, an HD geospatial database of the AV 150, other components of the AV, and other data sources. The perception stack 155 can detect and classify objects and determine their current and predicted locations, speeds, directions, and the like. In addition, the perception stack 155 can determine the free space around the AV 150 (e.g., to maintain a safe distance from other objects, change lanes, park the AV, etc.). The perception stack 155 can also identify environmental uncertainties, such as where to look for moving objects, flag areas that may be obscured or blocked from view, and so forth.

In embodiments herein, the AV 150 can utilize a trained ML model 135 to identify the portions of the navigable roadway that are used for parking. Various inputs from the perception stack 155 can be used by the trained ML model 135 to make this determination. For those portions of the navigable roadway that are determined to be used for parking, embodiments herein may then utilize one or more trained ML models 135 to determine both allowability (e.g., "is it legal to park in this space?") and availability (e.g., "can the AV park here (even if illegal)?") of the portions of the navigable roadway. In some embodiments, the availability may determine whether the AV fits in the portion of the roadway, whether the portion of the roadway is available for the time that the AV is to utilize the spot, and/or whether the portion of the roadway accommodates the needs of the trip (e.g., allow passenger ingress/egress, allow access to remove or load products, allow access for disabled/wheelchair accessibility needs, etc.), for example. In some embodiments, a single ML model 135, or multiple ML models 135, may be trained to determine portions of the navigable roadway that are used for parking, allowable for parking, and available for parking.

In embodiments herein, the parking location data 142 determined by the AV can be aggregated with other parking location data generated by other AVs in the fleet(s) of AVs. The AVs in the fleet can have the ability to share both historical and real-time information about available parking or pullover locations based upon the individual determinations of the AVs. This shared information could improve routing and communication with customers regarding parking location recommendations 145 for PU and DO. In some embodiment, the parking coordination system 140 utilizes a trained ML model 135 to generate its parking location recommendations 145. Further details of the real-time AV fleet parking availability are provided below with respect to FIGS. 2-5.

Figure 2A:
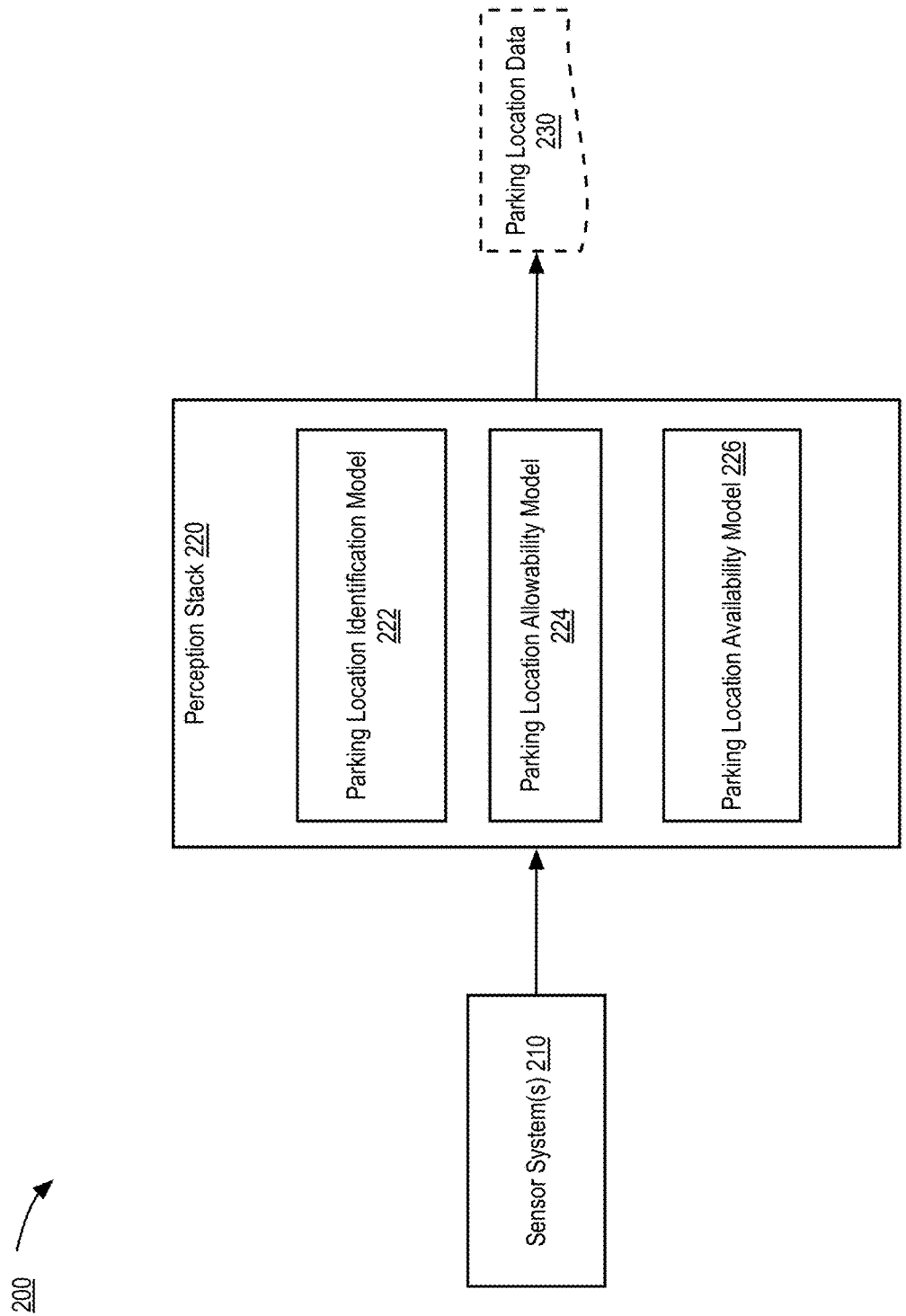
FIG. 2A is a block diagram of an AV system implementing real-time AV fleet parking availability, in accordance with embodiments herein.

FIG. 2A is a block diagram of an AV system 200 implementing real-time AV fleet parking availability, in accordance with embodiments herein. In one embodiment, AV system 200 is the same as AV 150 described with respect to FIG. 1. AV system 200 may include one or more sensor system(s) 210 and a perception stack 220, among other systems. The perception stack 220 may include a parking location identification model 222, a parking location allowability model 224, and a parking location availability model 226. In some embodiments, the parking location identification model 222, the parking location allowability model 224, and the parking location availability model 226 may be combined together into a single model, or may be some combination thereof.

In one embodiment, perception stack 220 can use perception data cultivated from the sensor systems 210 as inputs to the parking location identification model 222 to determine if a section of a roadway is used for vehicle parking (as opposed to vehicular travel, bicycle/other road user travel, or some other purpose). In one embodiment, parking location identification model 222 may be a trained ML model provided by an AI/ML system, such as AI/ML platform 130 described with respect to FIG. 1.

In one embodiment, inputs (e.g., perception data) to the parking location identification model 222 can include, but are not limited to, lane and other types of roadway paint (e.g., bicycle lane symbols, gore paint (the gore refers to the area of space that is between the through travel lanes and the off-ramp (e.g., triangular area located in between the lanes of a highway and either an entrance or an exit ramp)), parking space dividers) (visual data); roadway infrastructure objects in the roadway/drivable area (e.g., gore posts, physical parking space dividers like planters, armadillo bumps) (visual, LiDAR, RADAR data); and/or objects in the undriveable area (e.g., individual and shared parking meters, curb paint color, curb ramps, driveways) (visual, LiDAR, RADAR data).

In one embodiment, the parking location identification model 222 may generate a binary signal of "used for parking" (e.g., 1, set, etc.) or "not used for parking" (e.g., 0, not set, etc.). In some embodiments, the binary signal is generated based on a likelihood value in a range (e.g., 0 to 1) returned from the model 222 and whether that likelihood value satisfies a determined threshold. In some embodiments, the signal can be stored in a database of tracked objects as parking location data 230. In one embodiment, the parking location data 230 may be a parking location object that is a polygon or some other any-dimensional convex bounding box to represent the area assessed for parking. The parking location object can be stored with its associated binary indicator, along with relative distances to different AV locations (relative to a fixed location, such as GPS location of the AV) (i.e., 2.7 m to the northwest of AV location X, Y) data from the AV. In some embodiment, the parking location object and signal data is stored on the AV. In other embodiment, the parking location object and signal data is sent to a backend server of an AV ride-sharing service of the AV.

For the subset of roadway/drivable area that the perception stack 220 determines allowable for parking, further assessment can be made regarding allowability and availability of these areas. In one embodiment, additional perception stack data, as well as other non-perception information, can be used as additional inputs to a parking location allowability (e.g., legality) model 224. The parking location allowability model 224 and the parking location availability model 226 may be a trained ML model(s) provided by an AI/ML system, such as AI/ML platform 130 described with respect to FIG. 1. In some embodiments, the parking location allowability model 224 determines if it is allowable (e.g., legal) to occupy a parking space or set of parking spaces at a given time.

The additional inputs used by the parking location allowability model 224 and/or the parking location availability model 226 include, but are not limited to: local time of day (internal to the AV); objects in the parking area (e.g., parked vehicles, bicycles, humans, garbage cans, etc.) (visual, LiDAR, RADAR data); objects in the undriveable area (visual, LiDAR, RADAR data); roadway signs (visual data) (this could involve the use of machine vision/optical character recognition to process the information on the signs and a natural language model to determine what the signs are saying/what that means for the AV) (additionally, non-alphabetical symbols (such as arrows) could be processed and understood to determine direction/area of influence of signs, if any); curb paint color, including reflections off of windows/other cars if a particular length of curb is occluded from the AV (visual data); nearby law-enforcement road agents, particularly parking enforcement vehicles which have a distinct shape and paint scheme (visual, LiDAR, RADAR data); rate or volume of traffic citations issued on that block in a fixed time window around the AV's time (internal AV or external database); and so on.

In some example cases of application of embodiments are discussed further below. In one example embodiment, a parking space may not be assessed if it is already occupied. Instead, embodiments may determine if there is a vehicle(s) in a parking space adjacent to the spot being examined and perceived to be similar to the spot originally identified. Based on the similarity of the spaces and the presence of vehicles, an inference could be made at some confidence level of whether it is legal to park in the original space.

Alternatively or additionally, a previously history of a parking location being currently assessed can be considered. Since parking is often time and date restricted, this historical information can be used to gauge the likelihood that parking is allowed in the spot at the present date and time.

Furthermore, the presence of people in vehicles or whether vehicle warning lights are active can be utilized to determine whether parking is permitted. Namely, people often stay in their cars or put their hazard lights on when parking is not permitted. However, although parking is not permitted, presence of people in their cars and/or the hazard lights might indicate that the parking spot is commonly used for short drop-offs and pick-ups. Alternatively, presence of people in a car might indicate that the spot could be available soon.

Additionally, examining for both the presence of people issuing tickets on parked cars or pieces of papers on windshields might indicate that the parked cars are parked illegally. Although the AV may not definitively know that a piece of paper on a windshield is a ticket or a general flyer, this could work to inform the confidence on whether the space is a legal parking spot. Embodiments herein may also examine signs on the streets and either attempt to parse the text or compare with known signs to determine the legality of parking.

For permit parking, embodiments herein may detect common placards or stickers on vehicles parked in similar areas to determine if parking is permit only. In some embodiments, reading the actual placards or stickers may not have to be performed if the presence of similar indicators in similar locations on the vehicle could indicate the legality of parking.

Based on current or historical data, embodiments herein may determine a confidence level (confidence score) of whether the parking space is a legal parking space and this confidence score could be stored, shared, and updated by other AVs in the AV fleet.

In embodiments herein, the parking location allowability model 224 and/or the parking location availability model 226 can produce one or more of the following signals (or some combination of the following) to be appended to each of the parking location objects in the database of parking location data 230: a binary signal of [legal for parking, illegal for parking]; a binary signal of [available for parking, not available for parking]; and/or a continuous variable [0, inf] for how long the AV can legally park in a given parking space or set of spaces. As previously discussed, the binary signals may be based on a continuous range of values (e.g., likelihood, confidence, probability) outputted by a model and compared to a threshold value in order to determine the binary signal.

In embodiments herein, using all of the output signals from the models 222-226, an AV can dynamically determine where in the roadway is available and allowable (e.g., legal) for parking as it navigates a region. In some embodiment, although reference is made to a roadway, this could refer to any area where a determination is being made of whether the AV can park there (e.g., a parking lot, etc.).

Knowing all of the available and allowable locations for parking, the AV could then use that information in combination with additional inputs (discussed below) to determine the location to stop and/or park as a parking location recommendation. In some embodiments, the determination of the parking location recommendation may be centralized at the AV ride-sharing service and the AV ride-sharing service can utilize aggregated parking location data 230 received from multiple AVs in a fleet of AVs to make the determination of the parking location recommendation, as further discussed with respect to FIG. 2B below.

Figure 2B:
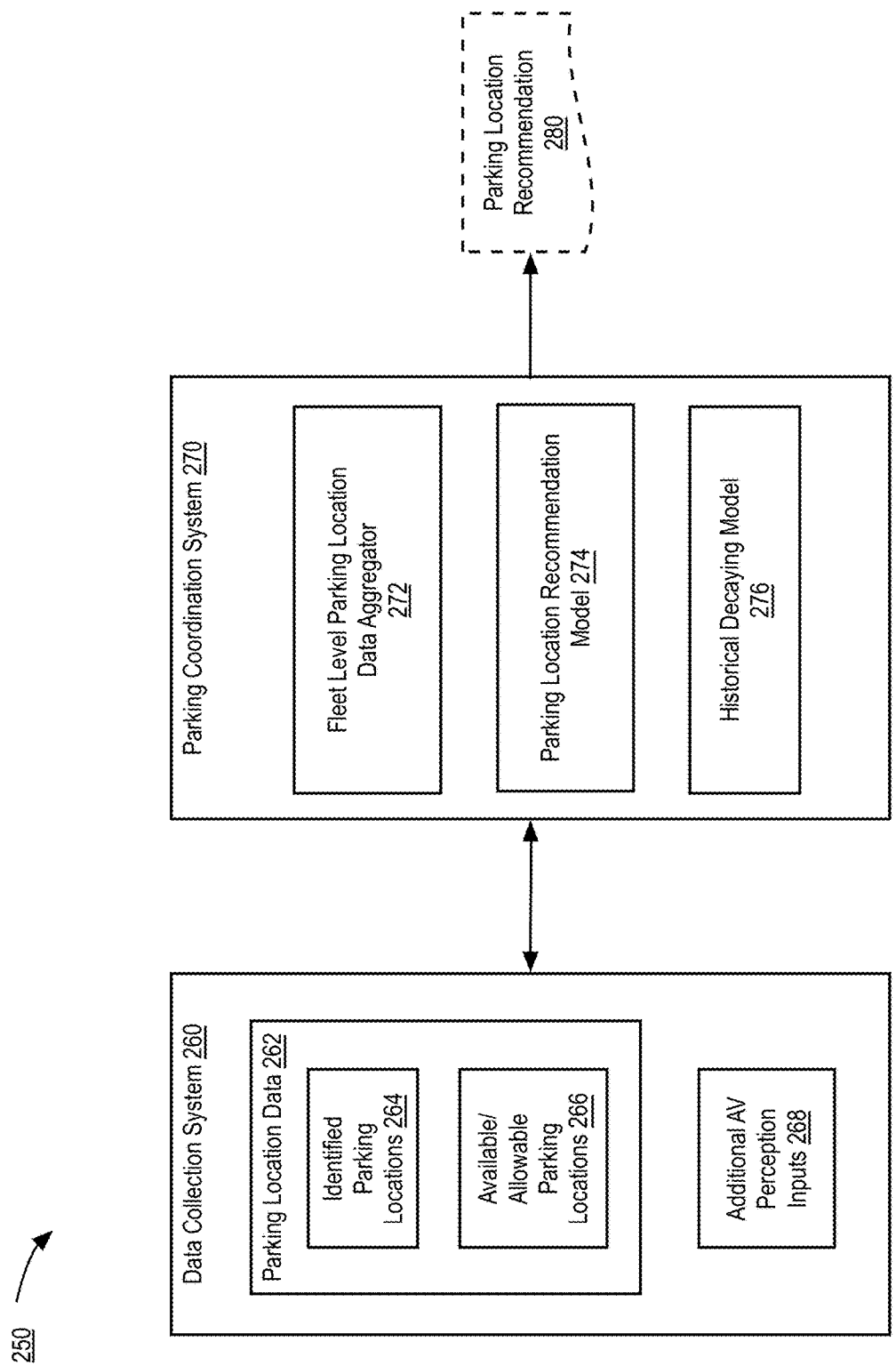
FIG. 2B is a block diagram of an AV ride-sharing service system implementing real-time AV fleet parking availability, in accordance with embodiments herein.

FIG. 2B is a block diagram of an AV ride-sharing service system 250 implementing real-time AV fleet parking availability, in accordance with embodiments herein. In one embodiment, AV ride-sharing service system 250 may be the same as, or part of, system 100 described with respect to FIG. 1. AV ride-sharing service system 250 may include a data collection system 260 and a parking coordination system 270, among other systems. In one embodiment, the parking coordination system 270 may be the same as parking coordination system 140 described with respect to FIG. 1.

In some embodiments, the parking coordination system 270 includes a fleet level parking location data aggregator 272. The fleet level parking location data aggregator 272 can collect and store parking location data 262 (which may be the same as parking location data 230 of FIG. 2A) from AVs in a fleet of AVs. The parking location data 262 may be stored in data collection system 260. This can include utilizing the parking location objects of parking location data 262 to store identified parking locations 264 and available/allowable parking locations 266 based on the signals provided with each parking location object.

Figure 3:
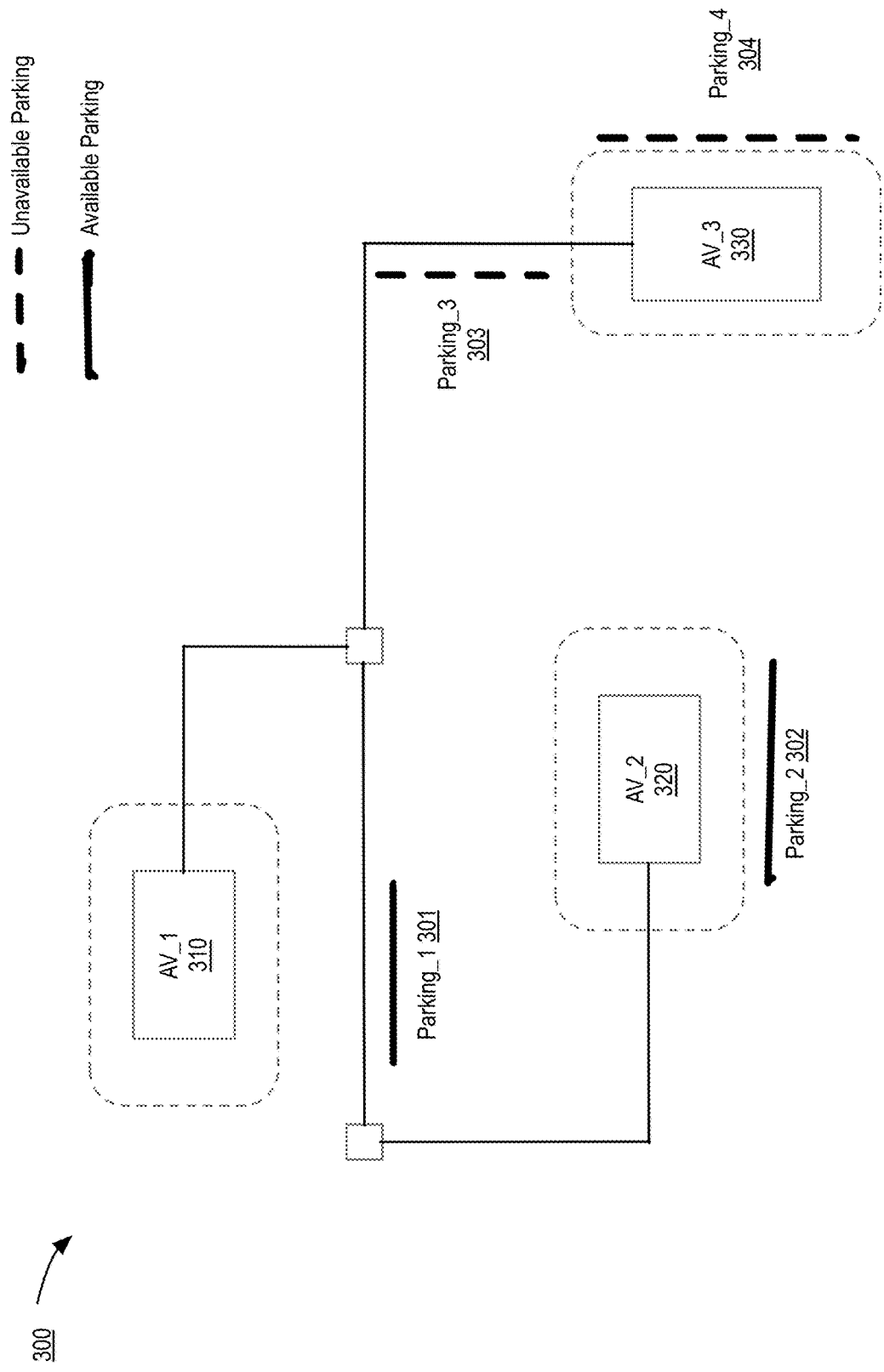
FIG. 3 is an example map illustrating fleet-level parking observations shared among AVs, in accordance with embodiments herein.

FIG. 3 is an example map 300 illustrating fleet-level parking observations shared among AVs, in accordance with embodiments herein. In the example of map 300, AV_1 310 and AV_2 320 may navigate around the map 300 while in service. During their navigations, AV_1 310 and AV_2 320 may provide parking location data indicating the parking space 1 (Parking_1 301) and parking space 2 (Parking_2 302) are available parking locations, while parking spots 3 and 4 (Parking_3 303 and Parking_4 304) are not available parking locations, along with a timestamp t indicating the time of observation for each parking space.

Using the known parking location data gathered by AV_1 310 and AV_2 320, a parking location recommendation can be made for AV_3 330 (e.g., recommending Parking_1 301 or Parking_2 302 based on the location and other perception inputs from AV_3 330). In some embodiments, AV_3 330 may include trained ML model(s) to provide the parking location recommendation based on the aggregated parking location data. In some embodiments, a parking coordination system of the AV ride-sharing service can implement the trained ML model(s) to provide the parking location recommendation(s) to AV_3 330 (as well as other fleet AVs).

Referring back to FIG. 2B, the parking coordination system 270 may include a parking location recommendation model 274 and/or a historical decaying model 276 to generate parking location recommendations 280 based on the parking location data 262 aggregated by fleet level parking location data aggregator 272. The parking location recommendation model 274 and/or the historical decaying model 276 may be trained ML model(s) provided by an AI/ML system, such as AI/ML platform 130 described with respect to FIG. 1. The parking location recommendation model 274 may utilize a location of the current AV requesting a parking location recommendation, as well as one or more additional perception inputs 268 (received from the AV) based on expected duration and/or traffic impedance experienced by the AV.

In some embodiments, the additional AV perception inputs 268 may include, but are not limited to, if the AV is picking up a passenger (and how many), dropping off a passenger (and how many), delivering groceries or food (and how much) (e.g., data provided from a dispatcher, internal seat occupancy sensors); how quickly the passengers usually ingress or egress the vehicle, how long it takes the customer to meet for pick-up (e.g., customer is walking towards the requested locations) (e.g., customer profile); nearby road agents' current positions (e.g., to keep enough gap) and their intentions (e.g., to avoid collision in their future path)/traffic volume (visual, LiDAR, RADAR data); historical traffic volume (e.g., internal AV or external database); blocked width on the driving lane (e.g., aiming for 0 if pull-over out of lane (OOL), but a small number of partial OOL is also better than full car width blockage) (e.g., dynamic AV data); locations of other AVs within a determined threshold distance of the AV (e.g., to prevent "clustering" of AVs in the same general location); and so on.

In embodiments herein, the parking location recommendation model 274 and/or the historical decaying model 276 of parking coordination system 270 can utilize the aggregated parking location data 262 and the additional AV perception inputs 268 to generate a parking location recommendation 280 for the AV. In some embodiments, the parking location recommendation model 274 could be trained and improved using spatially-tagged imagery and LiDAR, as well as labeled human parking observations. In some embodiments, the parking location recommendation model 274 could be updated offline using geotagged AV perception data from transportation trips.

In some embodiments, as part of generating the parking location recommendation 280, the historical decaying model 276 may be used to inform a likelihood that the parking location data is still valid. In one embodiment, the historical decaying model 276 may utilize the timestamps of the observance of the parking location data 262 as compared to the current time of the AV to inform a likelihood of validity. For example, the historical decaying model 276 may be configured with a tunable half-life of approximately 30 minutes, where a first guess is 30 minutes as a 50% probability that the pullover interval is still available. As such, each observed pullover interval is tracked with the time it was observed, and the historical decaying model 276 uses a decaying exponential to inform other AV's of the likelihood that it is available.

In some embodiments, in the case of a small fleet size (or a large operating area), there may be sparse observations of parking spots. This can be improved by continuously logging pullover observations, and using a historical model to predict availability, in the absence of recent observations. Under these conditions, the decaying probability of available parking can decay to the historical average, instead of decaying to zero.

FIG. 4 illustrates an example method 400 implementing real-time AV fleet parking availability, in accordance with embodiments herein. Although the example method 400 depicts a particular sequence of operations, the sequence may be altered without departing from the scope of the disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method 400 includes block 410 where, based on a first set of perception sensor inputs of an autonomous vehicle (AV), sections of roadway are determined that are used for vehicle parking. In one embodiment, the first set of perception sensor inputs includes at least one of lane paint, roadway paint, roadway infrastructure objects, or objects in an undriveable area. Then, at block 420, based on a second set of perception sensor inputs of the AV, it is determined whether each of the sections of roadway are allowable for parking and are available for parking. In one embodiment, the second set of perception sensor inputs includes at least one of local time of day internal to the AV, objects in the section of roadway, roadway signs, roadway symbols, roadway paint, curb paint, law enforcement road agents, or traffic citation data corresponding to a geographic location of the section of roadway in a fixed time window around the local time of day internal to the AV.

Subsequently, at block 430, parking location data is transmitted by the AV to a server device aggregating signals from a fleet of AVs comprising the AV. In one embodiment, the parking location data includes identification of parking location objects corresponding to the sections of roadway and one or more signals for each parking location object indicating that the parking location object is used for vehicle parking, indicating whether the parking location object is allowable for parking, and indicating whether the parking location object is available for parking. Lastly, at block 440, a location for parking for the AV is identified based on the parking location data sent by the AV and based on other parking location data sent from other AVs in the fleet of AVs.

FIG. 5 illustrates an example method 500 for implementing aggregated parking location data from a fleet of AVs to provide for real-time AV fleet parking availability, in accordance with embodiments herein. Although the example method 500 depicts a particular sequence of operations, the sequence may be altered without departing from the scope of the disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method 500 includes block 510 where parking location data from AVs of a fleet of AVs is aggregated at a server device. In one embodiment, the parking location data includes parking location objects identifying sections of roadway used for parking, one or more indications of whether the sections of roadway are allowable for parking and available for parking, and timestamps indicating a time of collection of the parking location data by the AVs. Then, at block 520, responsive to a request to determine a parking location for an AV of the fleet of AVs and based on an indicated geographic location for parking of the AV, at least one parking location for the AV is identified using the aggregated parking location data of the fleet of AVs.

Subsequently, at block 530, a decaying model is applied, using the timestamps, to the identified at least one parking location to generate a likelihood that the at least one parking location is valid. Lastly, at block 540, a parking location recommendation for the AV is generated based on the likelihood of availability of the identified at least one parking location.

Further to the descriptions above, a user may be provided with controls allowing the user to make an election as to both if and when systems, programs, or features described herein may enable collection of user information (e.g., information about a user's preferences, actions or activities, user's location, user's profession, user's biographical information, etc.), and if the user is to be sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to city, ZIP code, or state level), so that a particular location of a user cannot be determined. Thus, the user may have control over what information is collected about the user, how that information is used, and what information is provided to the user.

Figure 6:
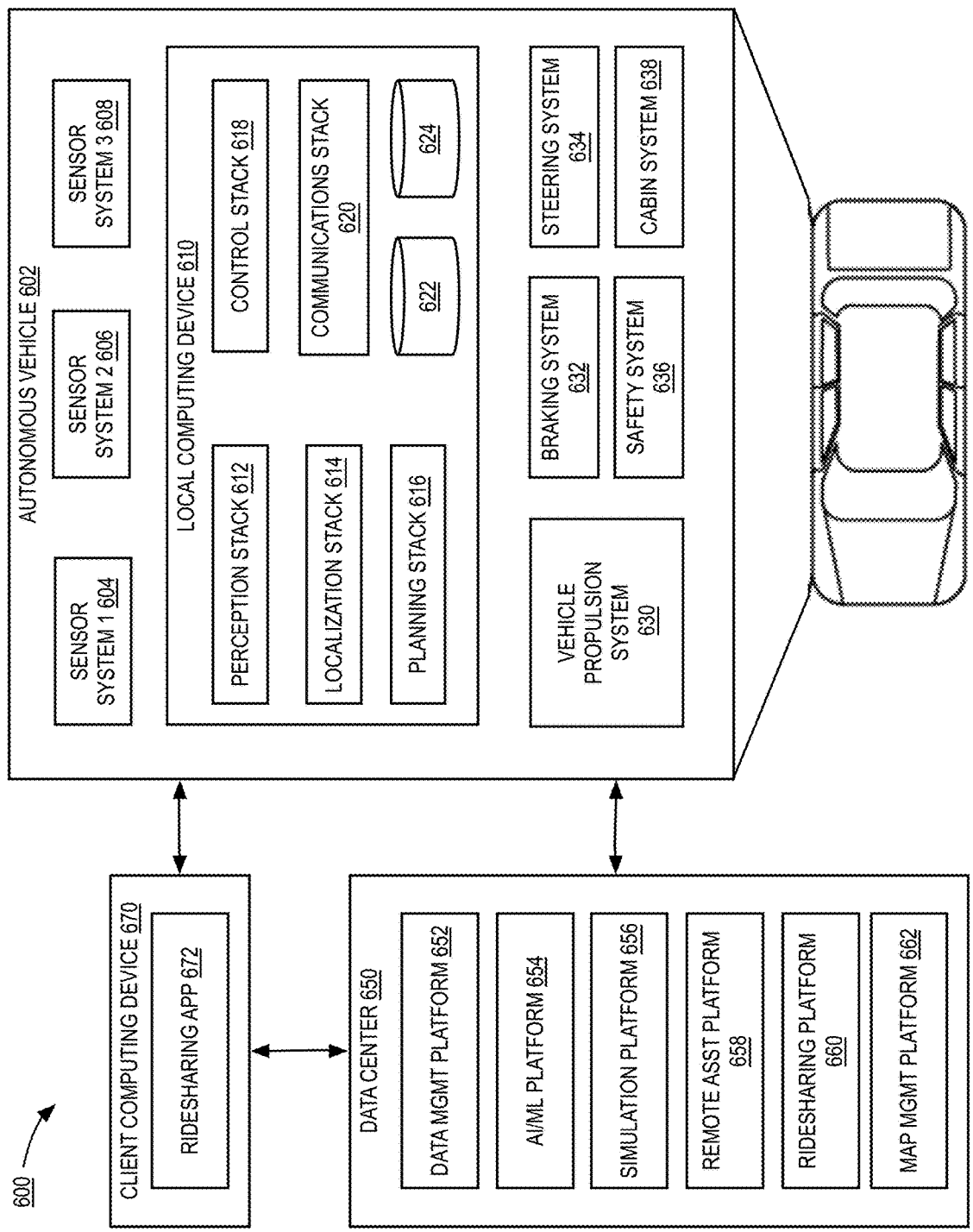
FIG. 6 illustrates an example system environment that can be used to facilitate AV dispatch and operations, according to some aspects of the disclosed technology.

Turning now to FIG. 6, this figure illustrates an example of an AV management system 600. In one embodiment, the AV management system 600 can implement real-time AV fleet parking availability, as described further herein. One of ordinary skill in the art will understand that, for the AV management system 600 and any system discussed in the disclosure, there can be additional or fewer components in similar or alternative configurations. The illustrations and examples provided in the disclosure are for conciseness and clarity. Other embodiments may include different numbers and/or types of elements, but one of ordinary skill the art will appreciate that such variations do not depart from the scope of the disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (posc) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further below with respect to FIG. 7 and elsewhere in the disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart car pods or other smart in-car, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Figure 7:
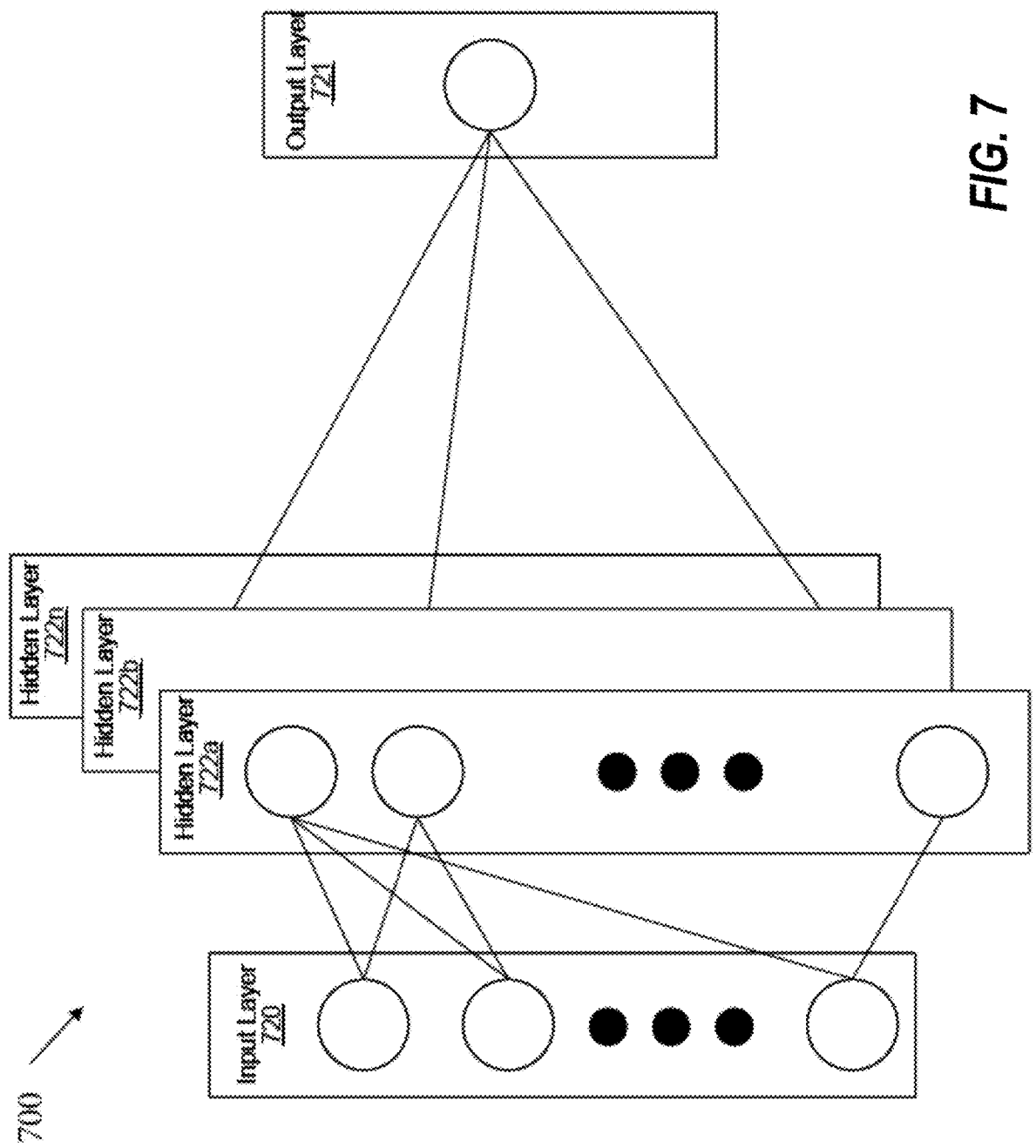
FIG. 7 illustrates an example of a deep learning neural network that can be used to implement a perception module and/or one or more validation modules, according to some aspects of the disclosed technology.

In FIG. 7, the disclosure now turns to a further discussion of models that can be used through the environments and techniques described herein. Specifically, FIG. 7 is an illustrative example of a deep learning neural network 700 that can be used to implement all or a portion of a perception module (or perception system) as discussed above. An input layer 720 can be configured to receive sensor data and/or data relating to an environment surrounding an AV. The neural network 700 includes multiple hidden layers 722a, 722b, through 722n. The hidden layers 722a, 722b, through 722n include "n" number of hidden layers, where "n" is an integer greater than or equal to one. The number of hidden layers can be made to include many layers for the given application. The neural network 700 further includes an output layer 721 that provides an output resulting from the processing performed by the hidden layers 722a, 722b, through 722n. In one illustrative example, the output layer 721 can provide estimated treatment parameters that can be used/ingested by a differential simulator to estimate a patient treatment outcome.

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the first hidden layer 722a can transform the information of each input node by applying activation functions to the input node information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 721, at which an output is provided. In some cases, while nodes in the neural network 700 are shown as having multiple output lines, a node can have a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a. 722b, through 722n in order to provide the output through the output layer 721.

In some cases, the neural network 700 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 700 is trained well enough so that the weights of the layers are accurately tuned.

To perform training, a loss function can be used to analyze errors in the output. Any suitable loss function definition can be used, such as a Cross-Entropy loss. Another example of a loss function includes the mean squared error (MSE), defined as $$E\_total = \sum \left( \frac{1}{2}(\text{target} - \text{output})^2 \right).$$

The loss can be set to be equal to the value of E_total.

The loss (or error) will be high for the initial training data since the actual values will be much different than the predicted output. The goal of training is to minimize the amount of loss so that the predicted output is the same as the training output. The neural network 700 can perform a backward pass by determining which inputs (weights) most contributed to the loss of the network, and can adjust the weights so that the loss decreases and is eventually minimized.

The neural network 700 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for down sampling), and fully connected layers. The neural network 700 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 8:
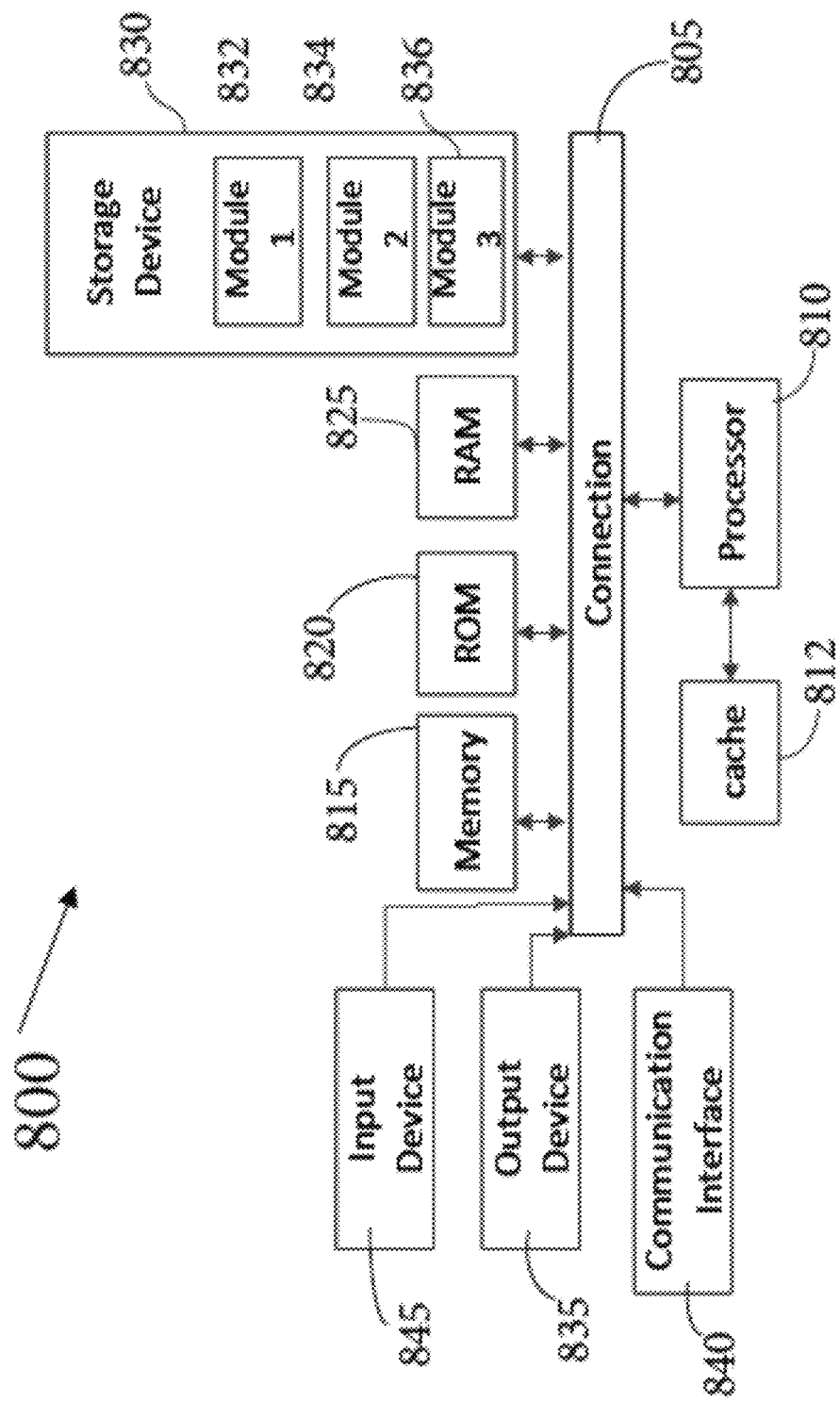
FIG. 8 illustrates an example processor-based system with which some aspects of the subject technology can be implemented.

FIG. 8 illustrates an example processor-based system with which some aspects of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 830 can include software services, servers, services, etc., that when the code that defines such software is executed by the processor 810, it causes the system 800 to perform a function. In some embodiments, a hardware service that performs a particular function can include the software component stored in a computer-readable medium in connection with hardware components, such as processor 810, connection 805, output device 835, etc., to carry out the function.

Embodiments within the scope of the disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 includes a method for facilitating real-time AV fleet parking availability, where the method comprises determining, by a processing device of an autonomous vehicle (AV) based on a first set of perception sensor inputs of the AV, sections of roadway that are used for vehicle parking; determining, based on a second set of perception sensor inputs of the AV, whether each of the sections of roadway are allowable for parking and are available for parking; transmitting, by the AV to a server device, parking location data comprising identification of parking location objects corresponding to the sections of roadway and one or more signals for each parking location object indicating that the parking location object is used for vehicle parking, indicating whether the parking location object is allowable for parking, and indicating whether the parking location object is available for parking, wherein the server device to aggregate the parking location data with other parking location data sent from other AVs in a fleet of AVs comprising the AV into aggregated parking location data; and identifying a location for parking of the AV based on the aggregated parking location data.

In Example 2, the subject matter of Example 1 can optionally include wherein the first set of perception sensor inputs comprises at least one of lane paint, roadway paint, roadway infrastructure objects, or objects in an undriveable area. In Example 3, the subject matter of any one of Examples 1-2 can optionally include wherein determining the sections of roadway that are used for vehicle parking further comprising applying a trained machine learning (ML) model using the first set of perception inputs to generate a signal indicating whether the section of roadway is used for parking or not used for parking. In Example 4, the subject matter of any one of Examples 1-3 can optionally include wherein the second set of perception sensor inputs comprises at least one of local time of day internal to the AV, objects in the section of roadway, roadway signs, roadway symbols, roadway paint, curb paint, law enforcement road agents, or traffic citation data corresponding to a geographic location of the section of roadway in a fixed time window around the local time of day internal to the AV.

In Example 5, the subject matter of any one of Examples 1-4 can optionally include wherein determining whether each of the sections of roadway are allowable for parking further comprising applying a trained machine learning (ML) model using the second set of perception inputs to generate a signal indicating whether the section of roadway is allowable for parking or not allowable for parking. In Example 6, the subject matter of any one of Examples 1-5 can optionally include wherein determining whether each of the sections of roadway are available for parking further comprising applying a trained machine learning (ML) model using the second set of perception inputs to generate a signal indicating whether the section of roadway is available for parking or not available for parking.

In Example 7, the subject matter of any one of Examples 1-6 can optionally include wherein identifying a location for parking of the AV further comprises receiving the location for parking from the server device, wherein the server device to apply a trained machine learning (ML) model to identifying the location for the parking of the AV, the trained ML model to receive as inputs a current location of the AV and a set of additional inputs corresponding to an expected duration of an AV stop in the parking location and traffic impedances corresponding to the AV at the current location of the AV. In Example 8, the subject matter of any one of Examples 1-7 can optionally include wherein the set of additional inputs comprising at least one of: passenger data, delivery data, internal seat occupancy data, customer profile data indicating rate of ingress or egress of passengers, nearby road agent positions, traffic volume data, historical traffic volume data, blocked width on a driving lane, or locations of other AVs within a determined threshold distance of the AV. In Example 9, the subject matter of any one of Examples 1-8 can optionally include wherein the trained ML model is further to apply a decaying model to the aggregated parking location data using timestamps of the parking location data to identify a likelihood that the parking location data is valid.

Example 10 includes an apparatus for facilitating real-time AV fleet parking availability, the apparatus of Example 10 comprising one or more hardware processors to: determine, based on a first set of perception sensor inputs of an autonomous vehicle (AV), sections of roadway that are used for vehicle parking; determine, based on a second set of perception sensor inputs of the AV, whether each of the sections of roadway are allowable for parking and are available for parking; transmit, by the AV to a server device, parking location data comprising identification of parking location objects corresponding to the sections of roadway and one or more signals for each parking location object indicating that the parking location object is used for vehicle parking, indicating whether the parking location object is allowable for parking, and indicating whether the parking location object is available for parking, wherein the server device to aggregate the parking location data with other parking location data sent from other AVs in a fleet of AVs comprising the AV into aggregated parking location data; and identify a location for parking of the AV based on the aggregated parking location data.

In Example 11, the subject matter of Example 10 can optionally include wherein the first set of perception sensor inputs comprises at least one of lane paint, roadway paint, roadway infrastructure objects, or objects in an undriveable area. In Example 12, the subject matter of Examples 10-11 can optionally include wherein the one or more hardware processors to determine the sections of roadway that are used for vehicle parking further comprises the one or more hardware processors to apply a trained machine learning (ML) model using the first set of perception inputs to generate a signal indicating whether the section of roadway is used for parking or not used for parking. In Example 13, the subject matter of Examples 10-12 can optionally include wherein the second set of perception sensor inputs comprises at least one of local time of day internal to the AV, objects in the section of roadway, roadway signs, roadway symbols, roadway paint, curb paint, law enforcement road agents, or traffic citation data corresponding to a geographic location of the section of roadway in a fixed time window around the local time of day internal to the AV.

In Example 14, the subject matter of Examples 10-13 can optionally include wherein the one or more hardware processors to determine whether each of the sections of roadway are allowable for parking further comprises the one or more hardware processors to apply a first trained machine learning (ML) model using the second set of perception inputs to generate a signal indicating whether the section of roadway is allowable for parking or not allowable for parking, and wherein the one or more hardware processors to determine whether each of the sections of roadway are available for parking further comprises the one or more hardware processors to apply a second trained ML model using the second set of perception inputs to generate a signal indicating whether the section of roadway is available for parking or not available for parking.

In Example 15, the subject matter of Examples 10-14 can optionally include wherein the one or more hardware processors to identify a location for parking of the AV further comprises the one or more hardware processors to receive the location for parking from the server device, wherein the server device to apply a trained machine learning (ML) model to identifying the location for the parking of the AV, the trained ML model to receive as inputs a current location of the AV and a set of additional inputs corresponding to an expected duration of an AV stop in the parking location and traffic impedances corresponding to the AV at the current location of the AV.

Example 16 is a non-transitory computer-readable storage medium for facilitating real-time AV fleet parking availability. The non-transitory computer-readable storage medium of Example 16 having stored thereon executable computer program instructions that, when executed by one or more processors, cause the one or more processors to: determine, based on a first set of perception sensor inputs of an autonomous vehicle (AV), sections of roadway that are used for vehicle parking; determine, based on a second set of perception sensor inputs of the AV, whether each of the sections of roadway are allowable for parking and are available for parking; transmit, by the AV to a server device, parking location data comprising identification of parking location objects corresponding to the sections of roadway and one or more signals for each parking location object indicating that the parking location object is used for vehicle parking, indicating whether the parking location object is allowable for parking, and indicating whether the parking location object is available for parking, wherein the server device to aggregate the parking location data with other parking location data sent from other AVs in a fleet of AVs comprising the AV into aggregated parking location data; and identify a location for parking of the AV based on the aggregated parking location data.

In Example 17, the subject matter of Example 16 can optionally include wherein the first set of perception sensor inputs comprises at least one of lane paint, roadway paint, roadway infrastructure objects, or objects in an undriveable area, and wherein the second set of perception sensor inputs comprises at least one of local time of day internal to the AV, objects in the section of roadway, roadway signs, roadway symbols, roadway paint, curb paint, law enforcement road agents, or traffic citation data corresponding to a geographic location of the section of roadway in a fixed time window around the local time of day internal to the AV. In Example 18, the subject matter of Examples 16-17 can optionally include wherein the one or more processors to determine the sections of roadway that are used for vehicle parking further comprises the one or more processors to apply a trained machine learning (ML) model using the first set of perception inputs to generate a signal indicating whether the section of roadway is used for parking or not used for parking.

In Example 19, the subject matter of Examples 16-18 can optionally include wherein the one or more processors to determine whether each of the sections of roadway are allowable for parking further comprises the one or more processors to apply a first trained machine learning (ML) model using the second set of perception inputs to generate a signal indicating whether the section of roadway is allowable for parking or not allowable for parking, and wherein the one or more processors to determine whether each of the sections of roadway are available for parking further comprises the one or more processors to apply a second trained ML model using the second set of perception inputs to generate a signal indicating whether the section of roadway is available for parking or not available for parking.

In Example 20, the subject matter of Examples 16-19 can optionally include wherein the one or more processors to identify a location for parking of the AV further comprises the one or more processors to receive the location for parking from the server device, wherein the server device to apply a trained machine learning (ML) model to identifying the location for the parking of the AV, the trained ML model to receive as inputs a current location of the AV and a set of additional inputs corresponding to an expected duration of an AV stop in the parking location and traffic impedances corresponding to the AV at the current location of the AV.

Example 21 is a system for facilitating real-time AV fleet parking availability. The system of Example 21 can optionally include a memory to store a block of data, and one or more hardware processors to determine, based on a first set of perception sensor inputs of an autonomous vehicle (AV), sections of roadway that are used for vehicle parking; determine, based on a second set of perception sensor inputs of the AV, whether each of the sections of roadway are allowable for parking and are available for parking; transmit, by the AV to a server device, parking location data comprising identification of parking location objects corresponding to the sections of roadway and one or more signals for each parking location object indicating that the parking location object is used for vehicle parking, indicating whether the parking location object is allowable for parking, and indicating whether the parking location object is available for parking, wherein the server device to aggregate the parking location data with other parking location data sent from other AVs in a fleet of AVs comprising the AV into aggregated parking location data; and identify a location for parking of the AV based on the aggregated parking location data.

In Example 22, the subject matter of Example 21 can optionally include wherein the first set of perception sensor inputs comprises at least one of lane paint, roadway paint, roadway infrastructure objects, or objects in an undriveable area. In Example 23, the subject matter of Examples 21-22 can optionally include wherein the one or more hardware processors to determine the sections of roadway that are used for vehicle parking further comprises the one or more hardware processors to apply a trained machine learning (ML) model using the first set of perception inputs to generate a signal indicating whether the section of roadway is used for parking or not used for parking. In Example 24, the subject matter of Examples 21-23 can optionally include wherein the second set of perception sensor inputs comprises at least one of local time of day internal to the AV, objects in the section of roadway, roadway signs, roadway symbols, roadway paint, curb paint, law enforcement road agents, or traffic citation data corresponding to a geographic location of the section of roadway in a fixed time window around the local time of day internal to the AV.

In Example 25, the subject matter of Examples 21-24 can optionally include wherein the one or more hardware processors to determine whether each of the sections of roadway are allowable for parking further comprises the one or more hardware processors to apply a first trained machine learning (ML) model using the second set of perception inputs to generate a signal indicating whether the section of roadway is allowable for parking or not allowable for parking, and wherein the one or more hardware processors to determine whether each of the sections of roadway are available for parking further comprises the one or more hardware processors to apply a second trained ML model using the second set of perception inputs to generate a signal indicating whether the section of roadway is available for parking or not available for parking.

In Example 26, the subject matter of Examples 21-25 can optionally include wherein the one or more hardware processors to identify a location for parking of the AV further comprises the one or more hardware processors to receive the location for parking from the server device, wherein the server device to apply a trained machine learning (ML) model to identifying the location for the parking of the AV, the trained ML model to receive as inputs a current location of the AV and a set of additional inputs corresponding to an expected duration of an AV stop in the parking location and traffic impedances corresponding to the AV at the current location of the AV.

Example 27 includes an apparatus comprising means for performing the method of any of the Examples 1-9. Example 28 is at least one machine readable medium comprising a plurality of instructions that in response to being executed on a computing device, cause the computing device to carry out a method according to any one of Examples 1-9. Example 29 is an apparatus for facilitating real-time AV fleet parking availability, configured to perform the method of any one of Examples 1-9. Specifics in the Examples may be used anywhere in one or more embodiments.

The various embodiments described above are provided by way of illustration and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method comprising:
    determining, by a processing device of an autonomous vehicle (AV) based on a first set of perception sensor inputs of the AV, sections of roadway that are used for vehicle parking;
    determining, based on a second set of perception sensor inputs of the AV, whether each of the sections of roadway are allowable for parking and are available for parking;
    transmitting, by the AV to a server device, parking location data comprising identification of parking location objects corresponding to the sections of roadway and one or more signals for each parking location object indicating that the parking location object is used for vehicle parking, indicating whether the parking location object is allowable for parking, and indicating whether the parking location object is available for parking, wherein the server device is to aggregate the parking location data with other parking location data sent from other AVs in a fleet of AVs comprising the AV into aggregated parking location data; and identifying a location for parking of the AV based on the aggregated parking location data, wherein identifying the location for parking of the AV further comprises receiving the location for parking from the server device, wherein the server device is to apply a trained machine learning (ML) model to identifying the location for the parking of the AV, and the trained ML model is to apply a decaying model to the aggregated parking location data using timestamps of the parking location data to identify a likelihood that the parking location data is valid.

2. The method of claim 1, wherein the first set of perception sensor inputs comprises at least one of lane paint, roadway paint, roadway infrastructure objects, or objects in an undriveable area.

3. The method of claim 1, wherein determining the sections of roadway that are used for vehicle parking further comprising applying a trained machine learning (ML) model using the first set of perception sensor inputs to generate a signal indicating whether the section of roadway is used for parking or not used for parking.

4. The method of claim 1, wherein the second set of perception sensor inputs comprises at least one of local time of day internal to the AV, objects in the section of roadway, roadway signs, roadway symbols, roadway paint, curb paint, law enforcement road agents, or traffic citation data corresponding to a geographic location of the section of roadway in a fixed time window around the local time of day internal to the AV.

5. The method of claim 1, wherein determining whether each of the sections of roadway are allowable for parking further comprising applying a trained machine learning (ML) model using the second set of perception sensor inputs to generate a signal indicating whether the section of roadway is allowable for parking or not allowable for parking.

6. The method of claim 1, wherein determining whether each of the sections of roadway are available for parking further comprising applying a trained machine learning (ML) model using the second set of perception sensor inputs to generate a signal indicating whether the section of roadway is available for parking or not available for parking.

7. The method of claim 1, wherein the trained ML model to receive as inputs a current location of the AV and a set of additional inputs corresponding to an expected duration of an AV stop in the parking location and traffic impedances corresponding to the AV at the current location of the AV.

8. The method of claim 7, wherein the set of additional inputs comprising at least one of: passenger data, delivery data, internal seat occupancy data, customer profile data indicating rate of ingress or egress of passengers, nearby road agent positions, traffic volume data, historical traffic volume data, blocked width on a driving lane, or locations of other AVs within a determined threshold distance of the AV.

9. The method of claim 1, wherein the decaying model is configured with a tunable half-life of a target amount of time, and the decaying model applies a decaying exponential with respect to identifying the likelihood that the parking location data is valid.

10. An apparatus comprising:
one or more hardware processors to:
determine, based on a first set of perception sensor inputs of an autonomous vehicle (AV), sections of roadway that are used for vehicle parking;
determine, based on a second set of perception sensor inputs of the AV, whether each of the sections of roadway are allowable for parking and are available for parking;
transmit, by the AV to a server device, parking location data comprising identification of parking location objects corresponding to the sections of roadway and one or more signals for each parking location object indicating that the parking location object is used for vehicle parking, indicating whether the parking location object is allowable for parking, and indicating whether the parking location object is available for parking, wherein the server device is to aggregate the parking location data with other parking location data sent from other AVs in a fleet of AVs comprising the AV into aggregated parking location data; and
identify a location for parking of the AV based on the aggregated parking location data, wherein in identifying the location for parking of the AV, the one or more hardware processors are to receive the location for parking from the server device,
wherein the server device is to apply a trained machine learning (ML) model to identify the location for the parking of the AV, and the trained ML model is to apply a decaying model to the aggregated parking location data using timestamps of the parking location data to identify a likelihood that the parking location data is valid.

11. The apparatus of claim 10, wherein the first set of perception sensor inputs comprises at least one of lane paint, roadway paint, roadway infrastructure objects, or objects in an undriveable area.

12. The apparatus of claim 10, wherein the one or more hardware processors to determine the sections of roadway that are used for vehicle parking further comprises the one or more hardware processors to apply a trained machine learning (ML) model using the first set of perception sensor inputs to generate a signal indicating whether the section of roadway is used for parking or not used for parking.

13. The apparatus of claim 10, wherein the second set of perception sensor inputs comprises at least one of local time of day internal to the AV, objects in the section of roadway, roadway signs, roadway symbols, roadway paint, curb paint, law enforcement road agents, or traffic citation data corresponding to a geographic location of the section of roadway in a fixed time window around the local time of day internal to the AV.

14. The apparatus of claim 10, wherein the one or more hardware processors to determine whether each of the sections of roadway are allowable for parking further comprises the one or more hardware processors to apply a first trained machine learning (ML) model using the second set of perception sensor inputs to generate a signal indicating whether the section of roadway is allowable for parking or not allowable for parking, and wherein the one or more hardware processors to determine whether each of the sections of roadway are available for parking further comprises the one or more hardware processors to apply a second trained ML model using the second set of perception sensor inputs to generate a signal indicating whether the section of roadway is available for parking or not available for parking.

15. The apparatus of claim 10, wherein the one or more hardware processors to identify a location for parking of the AV further comprises the one or more hardware processors to receive the location for parking from the server device, wherein the server device is to apply a trained machine learning (ML) model to identifying the location for the parking of the AV, the trained ML model to receive as inputs a current location of the AV and a set of additional inputs corresponding to an expected duration of an AV stop in the parking location and traffic impedances corresponding to the AV at the current location of the AV.

16. A non-transitory computer-readable medium having stored thereon instructions that, when executed by one or more processors, cause the one or more processors to:
  determine, based on a first set of perception sensor inputs of an autonomous vehicle (AV), sections of roadway that are used for vehicle parking; determine, based on a second set of perception sensor inputs of the AV, whether each of the sections of roadway are allowable for parking and are available for parking;
  transmit, by the AV to a server device, parking location data comprising identification of parking location objects corresponding to the sections of roadway and one or more signals for each parking location object indicating that the parking location object is used for vehicle parking, indicating whether the parking location object is allowable for parking, and indicating whether the parking location object is available for parking, wherein the server device is to aggregate the parking location data with other parking location data sent from other AVs in a fleet of AVs comprising the AV into aggregated parking location data; and
  identify a location for parking of the AV based on the aggregated parking location data, wherein in identifying the location for parking of the AV, the one or more processors are to receive the location for parking from the server device,
  wherein the server device is to apply a trained machine learning (ML) model to identify the location for the parking of the AV, and the trained ML model is to apply a decaying model to the aggregated parking location data using timestamps of the parking location data to identify a likelihood that the parking location data is valid.

17. The non-transitory computer-readable medium of claim 16, wherein the first set of perception sensor inputs comprises at least one of lane paint, roadway paint, roadway infrastructure objects, or objects in an undriveable area, and wherein the second set of perception sensor inputs comprises at least one of local time of day internal to the AV, objects in the section of roadway, roadway signs, roadway symbols, roadway paint, curb paint, law enforcement road agents, or traffic citation data corresponding to a geographic location of the section of roadway in a fixed time window around the local time of day internal to the AV.

18. The non-transitory computer-readable medium of claim 16, wherein the one or more processors to determine the sections of roadway that are used for vehicle parking further comprises the one or more processors to apply a trained machine learning (ML) model using the first set of perception inputs to generate a signal indicating whether the section of roadway is used for parking or not used for parking.

19. The non-transitory computer-readable medium of claim 16, wherein the one or more processors to determine whether each of the sections of roadway are allowable for parking further comprises the one or more processors to apply a first trained machine learning (ML) model using the second set of perception sensor inputs to generate a signal indicating whether the section of roadway is allowable for parking or not allowable for parking, and wherein the one or more processors to determine whether each of the sections of roadway are available for parking further comprises the one or more processors to apply a second trained ML model using the second set of perception sensor inputs to generate a signal indicating whether the section of roadway is available for parking or not available for parking.

20. The non-transitory computer-readable medium of claim 16, wherein the one or more processors to identify a location for parking of the AV further comprises the one or more processors to receive the location for parking from the server device, wherein the server device to apply a trained machine learning (ML) model to identifying the location for the parking of the AV, the trained ML model to receive as inputs a current location of the AV and a set of additional inputs corresponding to an expected duration of an AV stop in the parking location and traffic impedances corresponding to the AV at the current location of the AV.

* * * * *